United States Patent
Golyshko

(10) Patent No.: US 9,852,774 B2
(45) Date of Patent: Dec. 26, 2017

(54) METHODS AND SYSTEMS FOR PERFORMING PLAYBACK OPERATIONS BASED ON THE LENGTH OF TIME A USER IS OUTSIDE A VIEWING AREA

(71) Applicant: United Video Properties, Inc., Santa Clara, CA (US)

(72) Inventor: Phil Golyshko, Pacific Grove, CA (US)

(73) Assignee: Rovi Guides, Inc., San Carlos, CA (US)

( * ) Notice: Subject to any disclaimer, the term of this patent is extended or adjusted under 35 U.S.C. 154(b) by 0 days.

(21) Appl. No.: 14/265,713

(22) Filed: Apr. 30, 2014

(65) Prior Publication Data
US 2015/0319400 A1    Nov. 5, 2015

(51) Int. Cl.
| | |
|---|---|
| G11B 27/28 | (2006.01) |
| G11B 27/34 | (2006.01) |
| H04N 21/81 | (2011.01) |
| H04N 5/775 | (2006.01) |
| H04N 21/422 | (2011.01) |
| H04N 21/433 | (2011.01) |
| H04N 21/442 | (2011.01) |
| H04N 21/45 | (2011.01) |

(52) U.S. Cl.
CPC .............. *G11B 27/28* (2013.01); *G11B 27/34* (2013.01); *H04N 5/775* (2013.01); *H04N 21/42201* (2013.01); *H04N 21/42202* (2013.01); *H04N 21/4331* (2013.01); *H04N 21/44218* (2013.01); *H04N 21/4532* (2013.01); *H04N 21/81* (2013.01); *H04N 21/812* (2013.01)

(58) Field of Classification Search
CPC ........ G11B 27/28; G11B 27/34; H04N 5/775; H04N 21/81; H04N 21/812
USPC .......................................................... 386/230
See application file for complete search history.

(56) References Cited

U.S. PATENT DOCUMENTS

| | | | |
|---|---|---|---|
| 6,239,794 B1 | 5/2001 | Yuen et al. | |
| 6,388,714 B1 | 5/2002 | Schein et al. | |
| 6,564,378 B1 | 5/2003 | Satterfield et al. | |
| 6,756,997 B1 | 6/2004 | Ward, III et al. | |
| 7,165,098 B1 | 1/2007 | Boyer et al. | |
| 7,761,892 B2 | 7/2010 | Ellis et al. | |
| 8,046,801 B2 | 10/2011 | Ellis et al. | |

(Continued)

FOREIGN PATENT DOCUMENTS

| | | |
|---|---|---|
| JP | 2007/081719 | 3/2007 |
| WO | WO 2001/030070 | 4/2001 |
| WO | WO 2011/037761 | 3/2011 |

*Primary Examiner* — Gelek W Topgyal
(74) *Attorney, Agent, or Firm* — Haley Guiliano LLP

(57) ABSTRACT

Methods and systems are discussed herein for a media guidance application that automatically determines (e.g., without querying a user) whether or not to perform a playback operation (e.g., rewinding, returning to a previous chapter, continuing to play, etc.) on a media asset based on the amount of content that was missed by a user. For example, if a user missed only a small portion of content (e.g., was outside of a viewing area of the media asset for a short period of time), the media guidance application may determine that the media asset does not need to be rewound. However, if a user missed a large portion of content (e.g., was outside of a viewing area of the media asset for an extended period of time), the media guidance application may determine that the media asset does need to be rewound.

16 Claims, 7 Drawing Sheets

(56) References Cited

U.S. PATENT DOCUMENTS

| | | | |
|---|---|---|---|
| 9,014,546 B2* | 4/2015 | Shimy | G11B 27/105 |
| | | | 386/296 |
| 2002/0174430 A1 | 11/2002 | Ellis et al. | |
| 2003/0110499 A1 | 6/2003 | Knudson et al. | |
| 2005/0251827 A1 | 11/2005 | Ellis et al. | |
| 2006/0136496 A1* | 6/2006 | Ohashi | H04N 7/163 |
| 2006/0256133 A1* | 11/2006 | Rosenberg | G06Q 30/02 |
| | | | 345/619 |
| 2007/0033607 A1* | 2/2007 | Bryan | H04H 60/27 |
| | | | 725/10 |
| 2009/0052859 A1 | 2/2009 | Greenberger et al. | |
| 2010/0153885 A1 | 6/2010 | Yates | |
| 2011/0069940 A1 | 3/2011 | Shimy et al. | |
| 2011/0070819 A1 | 3/2011 | Shimy et al. | |
| 2011/0072452 A1 | 3/2011 | Shimy et al. | |
| 2012/0020641 A1 | 1/2012 | Sakaniwa et al. | |
| 2013/0011114 A1* | 1/2013 | Tashiro | G11B 27/105 |
| | | | 386/230 |
| 2015/0189339 A1* | 7/2015 | Sood | H04N 21/2401 |
| | | | 725/32 |

* cited by examiner

METHODS AND SYSTEMS FOR PERFORMING PLAYBACK OPERATIONS BASED ON THE LENGTH OF TIME A USER IS OUTSIDE A VIEWING AREA

BACKGROUND

Due to the availability of digital video recorders ("DVRs"), users are increasingly able to consume media outside the bounds of normal broadcast schedules. For example, users may pause or rewind live television, leaving them free to perform other activities without worrying about whether or not they will miss a portion of a program. Despite this, momentary distractions are often spontaneous and may require abrupt departures away from a device presenting a program. Given the spontaneity of the distractions, users may forget to pause the content before leaving or remember exactly where in the duration of the program they were before they left.

SUMMARY

Accordingly, methods and systems are discussed herein for a media guidance application that automatically determines (e.g., without querying a user) whether or not to perform a playback operation (e.g., rewinding, returning to a previous chapter, continuing to play, etc.) on a media asset based on the amount of content that was missed by a user. For example, if a user missed only a small portion of content (e.g., was outside of a viewing area of the media asset for a short period of time), the media guidance application may determine that the media asset does not need to be rewound. However, if a user missed a large portion of content (e.g., was outside of a viewing area of the media asset for an extended period of time), the media guidance application may determine that the media asset does need to be rewound.

If the media guidance application determines that a playback operation should be performed, the media guidance application may further determine what playback operation of a plurality of playback operations should be performed. For example, if a user missed a third of the media asset (e.g., was outside of a viewing area of the media asset for an extended period of time), the media guidance application may determine that the media asset should be rewound. However, if a user missed an almost the entire media asset (e.g., was outside of a viewing area of the media asset for most of the time in which the media asset was presented), the media guidance application may determine not to rewind the media asset and instead automatically record the media asset for viewing at a later time.

In some aspects, the media guidance application may generate for display a media asset on a display device, in which the display device is associated with a viewing area. For example, the media guidance application may generate for display a program on a television located within a particular room. In such a case, the particular room may constitute the viewing area.

The media guidance application may detect that a user in the viewing area has left the viewing area. For example, a detection module incorporated into or accessible by the media guidance application may monitor the viewing area to determine if and when a user is outside the viewing area (e.g., leaves the particular room).

The media guidance application determines a length of time that the user left the viewing area. For example, the media guidance application may initiate a timer in response to detecting that a user has left a room. The timer may run until the media guidance application detects that the user has returned to the room. The media guidance application may then compute the total time that the user was outside the room.

The media guidance application may then determine whether to perform a playback operation on the media asset based on the determined length of time. For example, the media guidance application may select a playback operation to perform, if any, from a plurality of playback operations based on the determined length of time.

In some embodiments, the media guidance application may cross-reference the determined length of time with a database listing a particular length of time that corresponds to each of the plurality of playback operations to select the playback operation. For example, if the user is outside the viewing area for only a short period of time (e.g., less than one minute), the media guidance application may not perform any playback operation. If the user is outside the viewing area for a medium period of time (e.g., one minute to ten minutes), the media guidance application may rewind, jump to a previous chapter, etc. If the user is outside the viewing area for a long period of time (e.g., over ten minutes), the media guidance application may record the media asset for viewing at a later time.

In some embodiments, the media guidance application may detect that the user in the viewing area has left the viewing area in response to determining the user was viewing the media asset prior to leaving the viewing area. For example, a detection module associated with or incorporated into the media guidance application may detect that a user is focusing on, or otherwise paying attention to, the media asset presented on the display device. In response, the media guidance application may monitor the movements of the user to determine whether or not one or more playback operations should be performed based on the movements of the user.

In some embodiments, the media guidance application may determine what playback operation, if any, to perform based on comparing the determined length of time to a threshold length of time. For example, one threshold length of time may correspond to a first playback operation and a second threshold of time may correspond to a second playback operation. The media guidance application may compare the determined length of time to one or more of these thresholds. If the determined length of time corresponds to the first threshold length of time the media guidance application performs the first playback operation, and/or if the determined length of time corresponds to the second threshold length of time the media guidance application performs the second playback operation.

In some embodiments, the media guidance application may select a playback operation based on one or more factors other than, or in addition to, the determined length of time, such as the content of the media asset, the length of time a user was in the viewing area prior to leaving, the number of users in the viewing area, etc. For example, the media guidance application may select the playback operation based on the content of the media asset presented on the display device during the determined length of time when the user was outside of the viewing area. For example, if the content of the media asset presented during the determined length of time was an advertisement and/or unimportant and/or uninteresting (e.g., based on stored user preferences), the media guidance application may account for this when selecting a playback operation.

For example, the media guidance application may determine the content presented on a display device during the determined length of time that the user was outside of the viewing area. For example, the media guidance application may determine whether or not an advertisement was presented. If a particular content (e.g., an advertisement) was presented, the media guidance application determines a length of time associated with a portion of the determined length of time during which the particular content (e.g., the advertisement) was not presented on the display device during the determined length of time that the user was outside of the viewing area.

The media guidance application may then compare the length of time that the content was not presented on the display device to a threshold length of time. Instead of selecting a playback operation based on the total length of the determined length of time, the media guidance application may select a playback operation based on the portion of the determined length of time that included the particular content (e.g., an advertisement). Alternatively, the media guidance application may subtract the amount of time constituting the portion from the total determined length of time to arrive at an amount of time of the determined length of time that did not include the particular content.

In another example, the media guidance application may determine an amount of time that the user was in the viewing area prior to leaving the viewing area and perform the playback operation based in part on the determined amount of time. For example, the media guidance application may distinguish between a user that briefly entered a viewing area (or briefly viewed a media asset) from a user that was previously engaged with or actively viewing a media asset.

In another example, the media guidance application may determine a number of people (and/or their movements) in the viewing area during the determined length of time and may perform a playback operation based in part on the determined number of people (and/or their movements). For example, if several people are in the viewing area (e.g., viewing the media asset), the media guidance application may not perform a playback operation based on the movements of only one of the users as such a playback operation may be distracting to the remaining users. Instead, the media guidance application may account for multiple users (e.g., only performing a playback operation if a majority of the users leave the viewing area).

It should be noted that the systems and/or methods described above may be combined with, applied to, or used in accordance with, other systems, methods and/or apparatuses discussed both above and below.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION OF THE DRAWINGS

Figure 1:
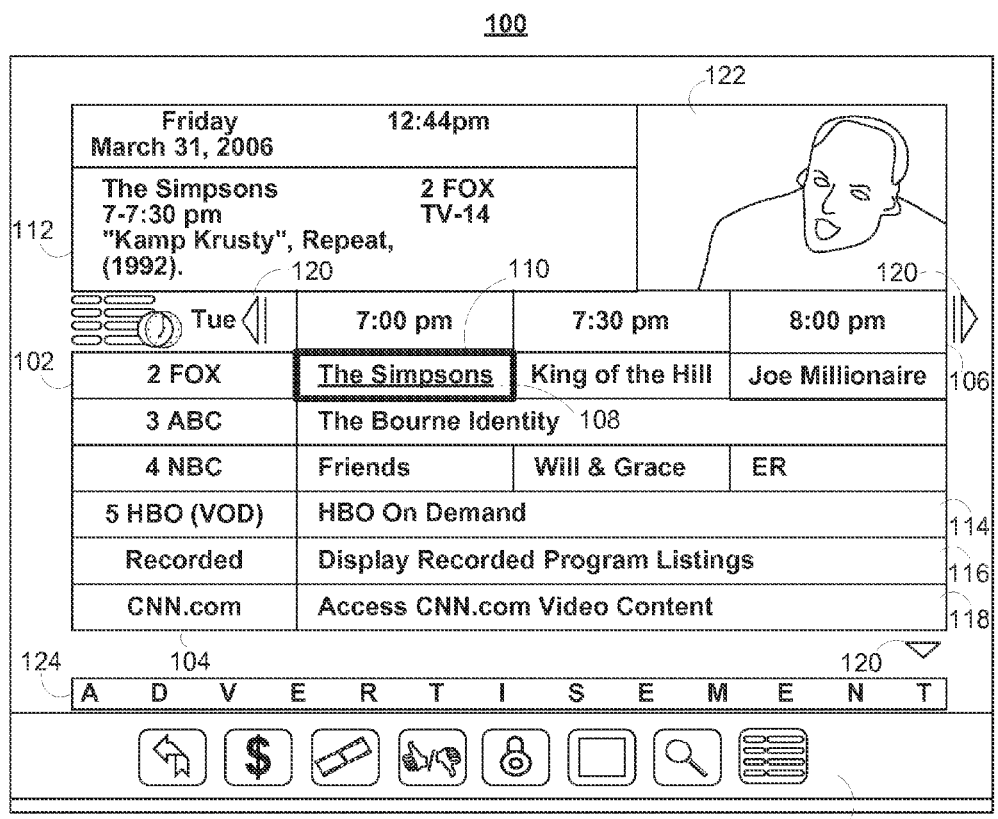
FIG. 1 shows an illustrative example of a media guidance display for navigating and selecting media assets in accordance with some embodiments of the disclosure.

Methods and systems are discussed herein for a media guidance application that automatically determines (e.g., without querying a user) whether or not to perform a playback operation (e.g., rewinding, returning to a previous chapter, continuing to play, etc.) a media asset based on the amount of content that was missed by a user. For example, if a user missed only a small portion of content (e.g., was outside of a viewing area of the media asset for a short period of time), the media guidance application may determine that the media asset does not need to be rewound. However, if a user missed a large portion of content (e.g., was outside of a viewing area of the media asset for an extended period of time), the media guidance application may determine that the media asset does need to be rewound.

As used herein, "a media guidance application," "interactive media guidance application," or "guidance application" refer to a form of media guidance through an interface that allows users to efficiently navigate, identify, view, playback, and/or obtain information about content that they may desire. Furthermore, the media guidance application may incorporate or have access to one or more components that receive information indicating whether or not a user has entered or exited a viewing area, in addition to other factors associated with the viewing area, in order to select a playback operation, if any, to perform.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed, or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

In some embodiments, the media guidance application may generate for display a media asset on a display of a user device, in which the user device is associated with a viewing area. For example, the media guidance application may generate for display a program on a television located within a particular room. In such a case, the particular room may constitute the viewing area.

As used herein, a "viewing area" refers to the maximum distance from a user device, in all directions, in which a user could feasibly consume a media asset present on the user device. For example, if the user device is a television, the viewing area may refer to the maximum distance from the television at which the average user can understand the content presented. In some embodiments, the viewing area may correspond to a perceivable range. Various systems and methods for detecting whether or not a user is within a range are discussed in, for example, Shimy, U.S. Patent Application Publication No. 2011/0069940, published May 24, 2011, which is hereby incorporated by reference herein in its entirety.

In some cases, the size of a viewing area is a function of the obstacles surrounding the user device. For example, if a personal computer resides in a small room with walls that prevent a user on an opposite side of the walls from understanding content presented on the personal computer, then the viewing area of personal computer corresponds to the area within the walls. Alternatively, if one of the walls were removed, such that a user, formerly opposite of the removed wall from the personal computer, can now understand the content presented on the personal computer, the viewing area associated with the personal computer has now expanded in the direction of the removed wall.

In some cases, the size of a viewing area is a function of the objects surrounding the user device. For example, if a television resides in a room with other devices, the audio output of which prevent a user a particular distance away from the television from hearing content presented on the television, then the viewing area of the television corresponds to the maximum distance away from the television that the user can hear content presented on the television due to the audio output of the other devices. Alternatively, if one of the other devices were removed, such that a user that could not previously hear content presented on the television can now hear the content presented on the television, the viewing area associated with television has now expanded due to the removal of the other device.

In some embodiments, the viewing area associated with a user device may correspond to the predetermined proximity to the user device. Alternatively, the predetermined proximity may refer to another area, which may or may not be associated with geographical boundaries and/or distances. For example, the predetermined proximity may refer to a finite measurement of distance from a user device.

In another example, the predetermined proximity may refer to an area at which user devices may connect with a network (e.g., a home network), not necessarily the distance or other relationship of a user to the user device. For example, to determine whether or not a user is within a viewing area, the media guidance application may base its determination on whether or not the user device can connect to a home network. For example, a user device such as a smartphone may be carried by a user from a viewing area (e.g., an area where the user device can receive and consequently present a media asset) to an area outside the viewing area (e.g., an area where the user device cannot receive or present the media asset).

In another example, to determine whether or not a user device is within a viewing area of a user device, the media guidance application may base its determination on data received from a global positioning system (e.g., indicating that the user is within a particular geographical boundary and/or distance). In yet another example, to determine whether or not a user is within a predetermined proximity to a user device, the media guidance application may base its determination on whether or not a user input is received indicating that the first user is within the viewing area.

Figure 3:
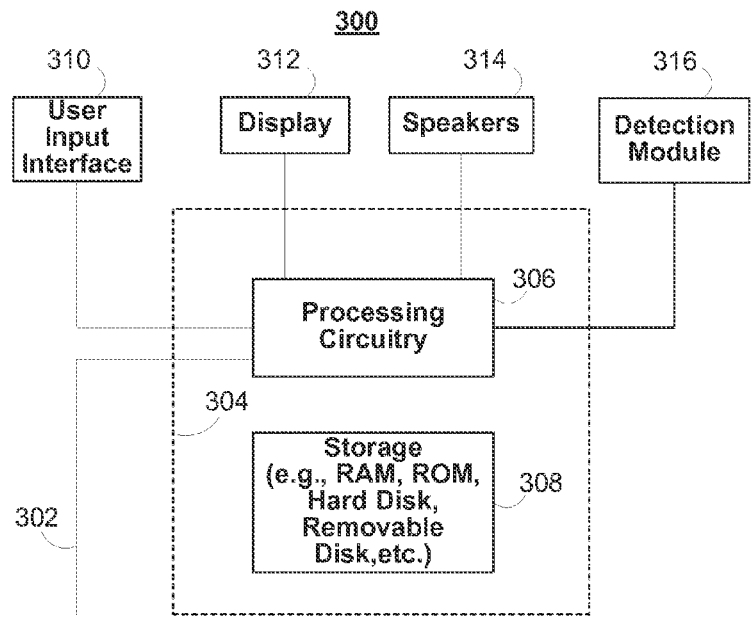
FIG. 3 is a block diagram of an illustrative user equipment device in accordance with some embodiments of the disclosure.

In some embodiments, the media guidance application may detect that a user in the viewing area has left the viewing area. For example, a detection module incorporated into or accessible by the media guidance application may monitor the viewing area to determine if and when a user is within or outside the viewing area. The media guidance application may employ numerous techniques for determining when a user enters or exits a viewing area as discussed in relation to detection module 316 (FIG. 3).

The media guidance application determines a length of time that the user left the viewing area. For example, the media guidance application may initiate a timer in response to detecting that a user has left a room. The timer may run until the media guidance application detects that the user has returned to the room. The media guidance application may then compute the total time that the user was outside the room.

In some embodiments, in response to determining that a user has entered or exited the viewing area, the media guidance application may determine a progress point of the media asset. For example, if a playback operation is performed, the media guidance application may need to determine how far to rewind a media asset or to what previous chapter of the media asset to jump back to. As used herein, a "progress point" refers to a finite location in the play length of a media asset. The progress point may indicate the location along the play length of the media asset in various terms (e.g., a minute mark, frame, scene, chapter, etc.).

Alternatively or additionally, the media guidance application may determine the current progress point of a media asset by comparing the current time to a time when the user entered or exited the viewing area. For example, the media guidance application may determine a current time (e.g., via a clock or counter function), which corresponds to the user returning to the viewing area after leaving, and compare the current time to the time that the user left the viewing area. For example, in response to determining that a user exited the viewing area at eight o'clock and the current time is eight-thirty, the media guidance application may determine that the user was outside the viewing area for thirty minutes.

In some embodiments, the media guidance application may select a progress point that corresponds to the determined amount of time. For example, if the media guidance application determines that a user was outside the viewing area for thirty minutes, and the media asset continued to play for the entire thirty minutes, the media guidance application may rewind the media asset to a point that corresponds to thirty minutes prior to the current progress point.

In some embodiments, the media guidance application may cross-reference the progress point with a database listing points in the media asset that should be returned to based on the determined length of time. For example, the media guidance application may rewind the media asset to a point that does not correspond to the determined length of time. Instead, the media guidance application may select a progress point that begins a chapter, segment, scene, or other division of the media asset in which the actual progress point that corresponds to the user exiting the viewing area corresponds. For example, if the user left the viewing area in the middle of a particular scene, the media guidance application may rewind to the beginning of the scene in order to refresh the memory of the user.

The media guidance application may then determine whether to perform a playback operation on the media asset based on the determined length of time. For example, the media guidance application may select a playback operation to perform, if any, from a plurality of playback operations based on the determined length of time.

As referred to herein, a "playback operation" refers to any media guidance application operation that relates to playing back a media asset. In some embodiments, the media guidance application may perform a fast-access playback operation. As referred to herein, the phrase "fast-access playback operations" should be understood to mean any playback operation that pertains to playing back a non-linear media asset faster than normal playback speed or in a different order than the media asset is designed to be played, such as a fast-forward, rewind, skip, chapter selection, segment selection, skip segment, jump segment, next segment, previous segment, skip advertisement or commercial, next chapter, previous chapter, or any other operation that does not play back the media asset at normal playback speed. The fast-access playback operation may be any playback operation that is not "play," where the play operation plays back the media asset at normal playback speed.

In should also be noted, that embodiments described herein relating to the performance of a playback operation may also relate to the performance of any media guidance application operation. For example, the media guidance application may select a any media guidance application to perform based on the determined length of time. As referred to herein, a "media guidance application operation" refers to any operation corresponding to providing, receiving, and generating media guidance data and/or media assets for consumption by a user. For example, media guidance application operations include displaying media guidance data, providing options to navigate, select, and edit media guidance data or content (e.g., a media asset) associated with media guidance data, and/or manipulating a device used to access (e.g., a display device), retrieve (e.g., a server), and/or associate media guidance data with a user.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

In some embodiments, the media guidance application may detect that the user in the viewing area has left the viewing area in response to determining the user was viewing the media asset prior to leaving the viewing area. For example, a detection module associated with or incorporated into the media guidance application may detect that a user is focusing on, or otherwise paying attention to, the media asset presented on the user device (e.g., as discussed in relation to FIG. 5 below). In response, the media guidance application may monitor the movements of the user to determine whether or not one or more playback operations should be performed based on the movements of the user.

In some embodiments, the media guidance application may determine what playback operation, if any, to perform based on comparing the determined length of time to a threshold length of time. As used herein, a "threshold length of time" is an amount of time that results in a predetermined action being performed. In some embodiments, the media guidance application may have numerous threshold lengths of time. For example, one threshold length of time may correspond to a first playback operation and a second threshold of time may correspond to a second playback operation. The media guidance application may compare the determined length of time to one or more of these thresholds. If the determined length of time corresponds to the first threshold length of time the media guidance application performs the first playback operation, and/or if the determined length of time corresponds to the second threshold length of time the media guidance application performs the second playback operation.

In some embodiments, the media guidance application may select a playback operation based on one or more factors other than, or in addition to, the determined length of time such as the content of the media asset, the length of time a user was in the viewing area prior to leaving, the number of users in the viewing area, etc. For example, the media guidance application may select the playback operation on the content of the media asset presented on the display device during the determined length of time when the user was outside of the viewing area. For example, if the content of the media asset presented during the determined length of time was an advertisement and/or unimportant and/or uninteresting (e.g., based on stored user preferences), the media guidance application may account for this when selecting a playback operation.

For example, the media guidance application may determine the content presented on a display device during the determined length of time when the user was outside of the viewing area. For example, the media guidance application may determine whether or not an advertisement was presented. If a particular content (e.g., an advertisement) was presented, the media guidance application determines a length of time associated with a portion of the determined length of time during which the particular content (e.g., the advertisement) was not presented on the display device during the determined length of time when the user was outside of the viewing area.

The media guidance application may then compare the length of time associated with the portion to a threshold length of time. Instead of selecting a playback operation based on the total length of the determined length of time, the media guidance application may select a playback operation based on the portion of the determined length of time that included the particular content (e.g., an advertisement). Alternatively, the media guidance application may subtract the amount of time constituting the portion from the total determined length of time to arrive at an amount of time of the determined length of time that did not include the particular content.

In another example, the media guidance application may determine an amount of time that the user was in the viewing area prior to leaving the viewing area and perform the playback operation based in part on the determined amount of time. For example, the media guidance application may distinguish between a user that briefly entered a viewing area (or briefly viewed a media asset) from a user that was previously engaged with or actively viewing a media asset.

In another example, the media guidance application may determine a number of people (and/or their movements) in the viewing area during the determined length of time and perform a playback operation based in part on the determined number of people (and/or their movements). For example, if several people are in the viewing area (e.g., viewing the media asset), the media guidance application may not perform a playback operation based on the movements of only one of the users as such a playback operation may be distracting to the remaining users. Instead, the media guidance application may account for multiple users (e.g., only performing a playback operation if a majority of the users leave the viewing area).

Figure 2:
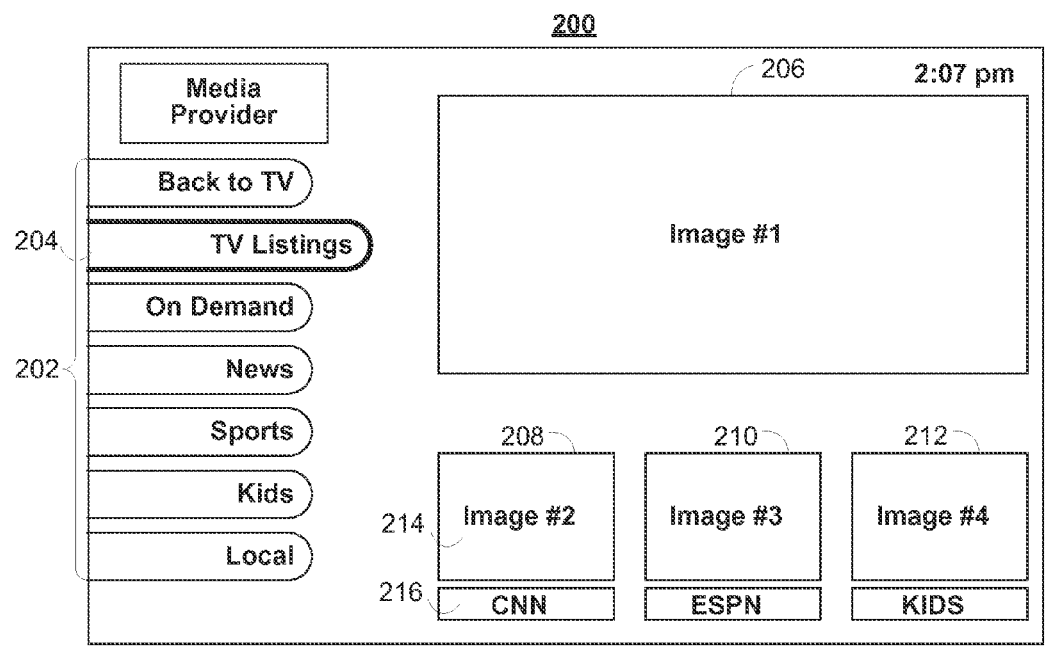
FIG. 2 shows another illustrative example of a media guidance display for navigating and selecting media assets in accordance with some embodiments of the disclosure.

FIGS. 1-2 show illustrative display screens that may be used to provide media guidance data. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 1 shows illustrative grid program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 312 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

User equipment device 300 may also incorporate or be accessible to detection module 316. For example, detection module 316 may identify particular users and/or the movements of the particular user. For example, via detection module 316, the media guidance application may determine when a user enters and/or exits a viewing area associated with a media asset and/or a display device. Detection module 316 may further include various components (e.g., a video detection component, an audio detection component, etc.). In some embodiments, detection module 316 may include components that are specialized to generate particular information (e.g., engagement indicia).

For example, as discussed below in relation to FIG. 5, detection module 316 may include an eye contact detection component, which determines or receives a location upon which one or both of a user's eyes are focused. The location upon which a user's eyes are focused is referred to herein as the user's "gaze point." In some embodiments, the eye contact detection component may monitor one or both eyes of a user of user equipment 300 to identify a gaze point on display 312 for the user. The eye contact detection component may additionally or alternatively determine whether one or both eyes of the user are focused on display 312 (e.g., indicating that a user is viewing display 312) or focused on a location that is not on display 312 (e.g., indicating that a user is not viewing display 312). In some embodiments, the eye contact detection component includes one or more sensors that transmit data to processing circuitry 306, which determines a user's gaze point. The eye contact detection component may be integrated with other elements of user equipment device 300, or the eye contact detection component, or any other component of detection module 316, and may be a separate device or system in communication with user equipment device 300.

In some embodiments, detection module 316 may include a content recognition module to determine the content of a presented media asset (e.g., whether or not an advertisement, content of interest to a user, etc.) is being presented, the number of people in a viewing area, and/or the level of engagement of each person in the viewing area. The content recognition module may use object recognition techniques such as edge detection, pattern recognition, including, but not limited to, self-learning systems (e.g., neural networks), optical character recognition, on-line character recognition (including but not limited to, dynamic character recognition, real-time character recognition, intelligent character recognition), and/or any other suitable technique. For example, the media guidance application may receive data in the form of a video. The video may include a series of frames. For each frame of the video, the media guidance application may use a content recognition module or algorithm to determine the people (including the actions associated with each of the people) in each of the frames or series of frames and/or where each identified person is looking. Alternatively or additionally, for each frame of the video, the media guidance application may use a content recognition module or algorithm to determine the content of one or more frames of a media asset. The media guidance application may then compare the determined content to user preference information (e.g., retrieved from a user profile).

In some embodiments, the content recognition module or algorithm may also include speech recognition techniques, including but not limited to Hidden Markov Models, dynamic time warping, and/or neural networks (as described above) to translate spoken words into text and/or processing audio data. The content recognition module may also combine multiple techniques to determine the content of a presented media asset (e.g., whether or not an advertisement, content of interest to a user, etc.) is being presented, the number of people in a viewing area, and/or the level of engagement of each person in the viewing area. For example, a video detection component of the detection module may generate data indicating that two people are within a viewing area of a user device. An audio component of the detection module may generate data indicating that the two people are currently engaged in a conversation about the media assets (e.g., by determining and processing keywords in the conversation).

In addition, the media guidance application may use multiple types of optical character recognition and/or fuzzy logic, for example, when processing keyword(s) retrieved from data (e.g., textual data, translated audio data, user inputs, etc.) describing the engagement of a user (or when cross-referencing various types of data in databases). For example, if the particular data received is textual data, using fuzzy logic, the media guidance application (e.g., via a content recognition module or algorithm incorporated into, or accessible by, the media guidance application) may determine two fields and/or values to be identical even though the substance of the data or value (e.g., two different spellings) is not identical. In some embodiments, the media guidance application may analyze particular received data of a data structure or media asset frame for particular values or text using optical character recognition methods described above in order to determine the engagement of a user. The data received could be associated with data describing the engagement of the user and/or any other data required for the function of the embodiments described herein. Furthermore, the data could contain values (e.g., the data could be expressed in binary or any other suitable code or programming language).

In some embodiments, detection module 316 may also detect other user actions and/or movements. For example, if the media guidance application determines that a user is currently accessing another media asset on a second device, the media guidance application may determine that the user is not viewing a media asset on a first device despite being within a viewing area. However, if the content on the second device is similar (e.g., relates to the same subject matter, product, genre, etc.) to the content associated with the first device, the media guidance application may determine that the user is viewing the media asset on the first device.

The media guidance application (e.g., via detection module 316) may also verify a user interest through other means. For example, the media guidance application, using a detection module (e.g., detection module 316 (FIG. 3)), may query the search history associated with a search engine accessed from a second device (e.g., a smartphone or tablet computer) being used by a user within the viewing area of the display device associated with the media guidance application. Upon detecting that the user previously searched for information similar to the information currently presented by the user device, the media guidance application may determine that the user in viewing the media asset.

In another example, the media guidance application, using a detection module (e.g., detection module 316 (FIG. 3)), may analyze keywords within a conversation between users occurring within the viewing area of a display device. If any of the keywords describe an interest in the content presented on the user device (e.g., as determined by a cross-reference with a database indicating words indicative of an interest in the content), the media guidance application may determine that the user is viewing the media asset.

The media guidance application may also receive (e.g., via detection module 316 (FIG. 3)) user-generated data (e.g., status updates, microblog posts, etc.) describing a media asset and/or advertisement generated for display by the media guidance application. For example, if a user posts an update to a social media website that he/she is currently enjoying a media asset, the media guidance application may determine the user is viewing the media asset.

Based on this information, the media guidance application may determine what playback operation, if any, to perform. For example, if a social network site associated with a user received a predetermined number of status updates, microblog posts, etc. related to the media asset (e.g., indicating a large amount of user interest in that portion of the media asset), the media guidance application may determine to rewind the media asset to allow the user to view that portion. Alternatively, if the social network site associated with the user did not receive the predetermined number of status updates, microblog posts, etc. related to the media asset (e.g., indicating a lack of user interest in that portion of the media asset), the media guidance application may determine to not rewind the media asset.

As used herein, a "social network," refers to a platform that facilitates networking and/or social relations among people who, for example, share interests, activities, backgrounds, and/or real-life connections. In some cases, social networks may facilitate communication between multiple user devices (e.g., computers, televisions, smartphones, tablets, etc.) associated with different users by exchanging content from one device to another via a social media server. As used herein, a "social media server" refers to a computer server that facilitates a social network. For example, a social media server owned/operated/used by a social media provider may make content (e.g., status updates, microblog posts, images, graphic messages, etc.) associated with a first user accessible to a second user that is within the same social network as the first user.

In some embodiments, the media guidance application may determine what playback operation, if any, to perform based on the length of time that the user left the viewing area and based on the content (and/or whether the user is likely to be interested in the content). For example, the media guidance application may first determine the length of time that a user was outside a viewing area and then determine the content that was presented during that time (e.g., as discussed below in relation to FIG. 8).

The guidance application may be implemented using any suitable architecture. For example, it may be a stand-alone application wholly implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
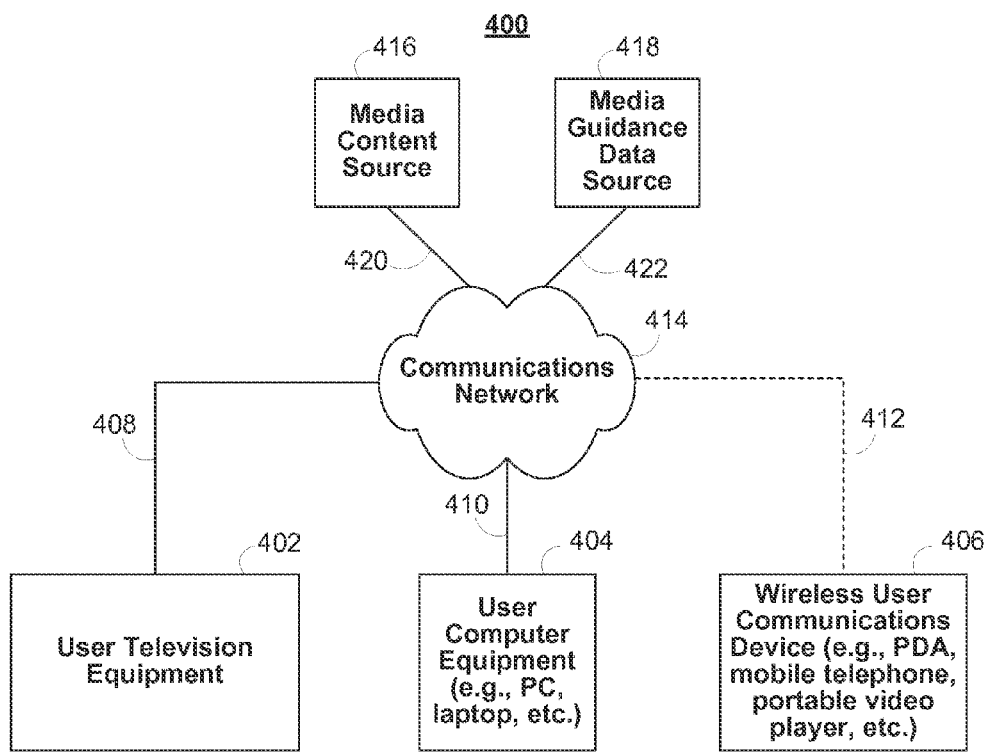
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be provided to the user equipment devices using any suitable approach. In some embodiments, the guidance application may be a standalone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

Media guidance applications may be, for example, standalone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

Figure 5:
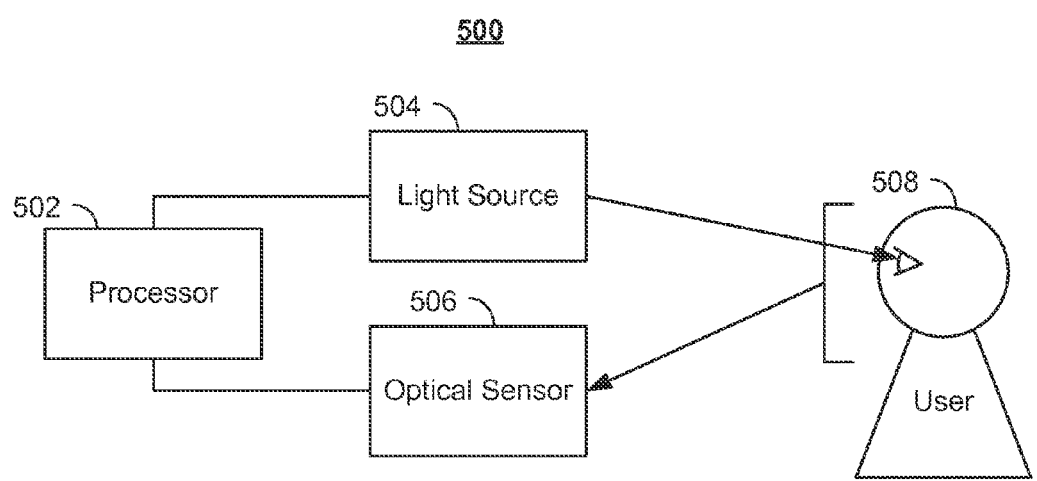
FIG. 5 is diagram of a system used to determine whether or not a user is viewing a media asset on a display device in accordance with some embodiments of the disclosure.

FIG. 5 is an illustrative example of one component of a detection module (e.g., detection module 315 (FIG. 3)) that may be accessed by a media guidance application in accordance with some embodiments of the disclosure. FIG. 5 shows eye contact detection component 500, which may be used to identify the gaze point of a user of user equipment 300, in order to determine the engagement level of the user. Eye contact detection component 500 includes processor 502, light source 504, and optical sensor 506. Light source 504 transmits light that reaches at least one eye of a user, and optical sensor 506 is directed at the user to sense reflected light. Optical sensor 506 transmits collected data to processor 502, and based on the data received from optical sensor 506, processor 502 determines a user's gaze point.

In some embodiments, eye contact detection component 500 is configured for determining a gaze point of a single user. In other embodiments, eye contact detection component 500 may determine gaze points for a plurality of users.

Processor 502 may be integrated with one or more light sources 504 and one or more optical sensors 506 in a single device. Additionally or alternatively, one or more light sources 504 and one or more optical sensors 506 may be housed separately from processor 502 and in wireless or wired communication with processor 502. One or more of processors 502, light sources 504, and optical sensors 506 may be integrated into a user device (e.g., user equipment device 300 (FIG. 3)).

Processor 502 may be similar to processing circuitry 306 (FIG. 3) described above. In some embodiments, processor 502 may be processing circuitry 306 (FIG. 3), with processing circuitry 306 in communication with light source 504 and optical sensor 506. In other embodiments, processor 502 may be separate from but optionally in communication with processing circuitry 306.

Light source 504 transmits light to one or both eyes of one or more users. Light source 504 may emit, for example, infrared (IR) light, near infrared light, or visible light. The light emitted by light source 504 may be collimated or non-collimated. The light is reflected in a user's eye, forming, for example, the reflection from the outer surface of the cornea (i.e., a first Purkinje image), the reflection from the inner surface of the cornea (i.e., a second Purkinje image), the reflection from the outer (anterior) surface of the lens (i.e., a third Purkinje image), and/or the reflection from the inner (posterior) surface of the lens (i.e., a fourth Purkinje image).

Optical sensor 506 collects visual information, such as an image or series of images, of one or both of one or more users' eyes. Optical sensor 506 transmits the collected image(s) to processor 502, which processes the received image(s) to identify a glint (i.e., corneal reflection) and/or other reflection in one or both eyes of one or more users. Processor 502 may also determine the location of the center of the pupil of one or both eyes of one or more users. For each eye, processor 502 may compare the location of the pupil to the location of the glint and/or other reflection to estimate the gaze point. Processor 502 may also store or obtain information describing the location of one or more light sources 504 and/or the location of one or more optical sensors 506 relative to a display (e.g., display 312 (FIG. 3)). Using this information, processor 502 may determine a user's gaze point on a display (e.g., display 312 (FIG. 3)), or processor 502 may determine whether or not a user's gaze point is the display (e.g., display 312 (FIG. 3)).

In some embodiments, eye contact detection component 500 performs best if the position of a user's head is fixed or relatively stable. In other embodiments, eye contact detection component 500 is configured to account for a user's head movement, which allows the user a more natural viewing experience than if the user's head were fixed in a particular position.

In some embodiments accounting for a user's head movement, eye contact detection component 500 includes two or more optical sensors 506. For example, two cameras may be arranged to form a stereo vision system for obtaining a 3D position of the user's eye or eyes; this allows processor 502 to compensate for head movement when determining the user's gaze point. The two or more optical sensors 506 may be part of a single unit or may be separate units. For example, a user device (e.g., user equipment device 300 (FIG. 3)) may include two cameras used as optical sensors 506, or eye contact detection component 500 in communication with the user device (e.g., user equipment device 300 (FIG. 3)) may include two optical sensors 506. In other embodiments, each of the user device (e.g., user equipment device 300 (FIG. 3)) and eye contact detection component 500 may include an optical sensor, and processor 502 receives image data from the optical sensor of the user device and the optical sensor of eye contact detection component 500. Processor 502 may receive data identifying the location of optical sensor 506 relative to a display (e.g., display 312 (FIG. 3)) and/or relative to each other and use this information when determining the gaze point.

In other embodiments accounting for a user's head movement, eye contact detection component 500 includes two or more light sources for generating multiple glints. For example, two light sources 504 may create glints at different locations of an eye; having information on the two glints allows the processor to determine a 3D position of the user's eye or eyes, allowing processor 502 to compensate for head movement. Processor 502 may also receive data identifying the location of light sources 504 relative to a display (e.g., display 312 (FIG. 3)) and/or relative to each other and use this information when determining the gaze point.

In some embodiments, other types of eye contact detection components that do not utilize a light source may be used. For example, optical sensor 506 and processor 502 may track other features of a user's eye, such as the retinal blood vessels or other features inside or on the surface of the user's eye, and follow these features as the eye rotates. Any other equipment or method for determining one or more users' gaze point(s) not discussed above may be used in addition to or instead of the above-described embodiments of eye contact detection component 500.

It should be noted that eye contact detection component 500 is but one type of component that may be incorporated into or accessible by detection module 316 (FIG. 3) or the media guidance application. Other types of components, which may generate other types of data (e.g., video, audio, textual, etc.), are fully within the bounds of this disclosure.

Figure 6:
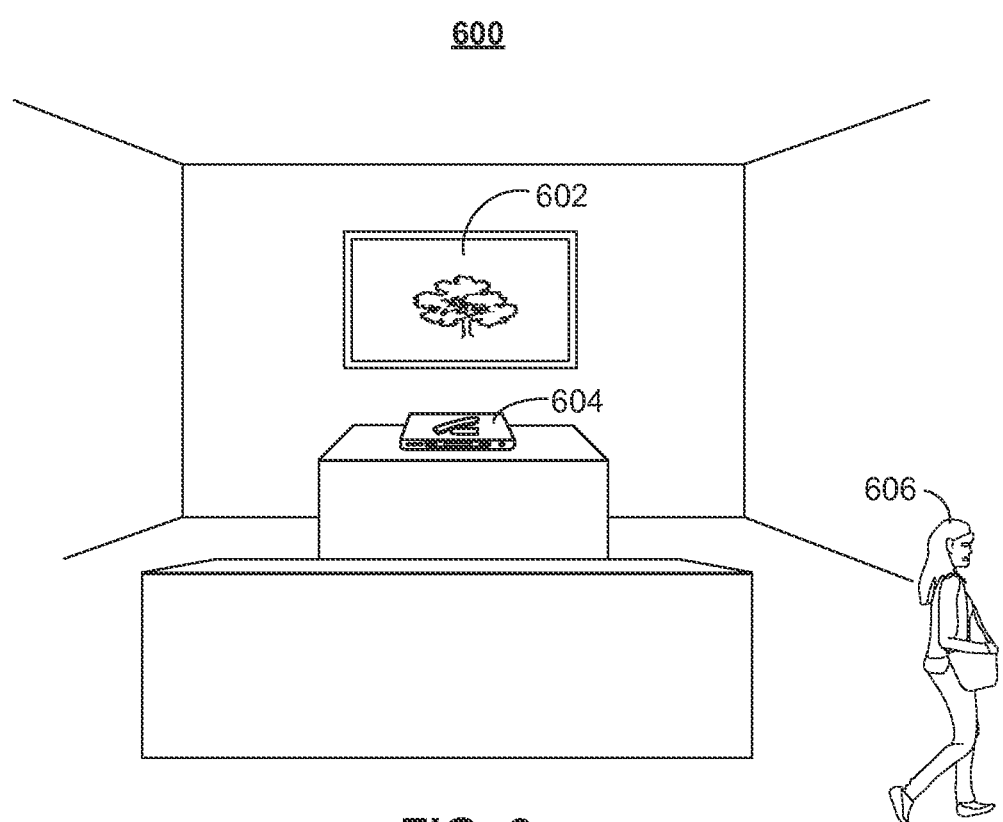
FIG. 6 is a diagram of a viewing area featuring a user in which the movements of the user are monitored in accordance with some embodiments of the disclosure.

FIG. 6 is a diagram of a viewing area featuring a user. FIG. 6 shows viewing area 600. In viewing area 600, media asset 602 is currently being presented on user device 604. Furthermore, user 606 is currently within viewing area 600. As discussed in relation to FIGS. 6-7 below, the media guidance application may automatically determines (e.g., without querying user 606) whether or not to perform a playback operation (e.g., rewinding, returning to a previous chapter, continuing to play, etc.) on media asset 602 based on the amount of content of media asset 602 that user 606 misses due to user 606 being outside of viewing area 600.

For example, if user 606 missed only a small portion of content (e.g., was outside of viewing area 600 of media asset 602 for a short period of time), the media guidance application may determine that the media asset does not need to be rewound. However, if user 606 missed a large portion of content (e.g., was outside of viewing area 600 of media asset 602 for an extended period of time), the media guidance application may determine that the media asset does need to be rewound.

If the media guidance application determines that a playback operation should be performed, the media guidance application may further determine what playback operation of a plurality of playback operations should be performed. For example, if a user missed a third of media asset 602 (e.g., was outside of viewing area 600 of media asset 602 for an extended period of time), the media guidance application may determine that media asset 600 should be rewound. However, if a user missed an almost the entire play length media asset 602 (e.g., was outside of viewing area 600 of media asset 602 for most of the time in which media asset 602 was presented), the media guidance application may determine not to rewind media asset 602 and instead automatically record media asset 602 (e.g., perform a media guidance application operation) such that the user may view media asset 602 at a later time.

In some embodiments, the media guidance application may detect (e.g., via detection module 316 (FIG. 3)) that user 606 in viewing area 600 has left and/or returned to viewing area 600. Furthermore, in some embodiments, the media guidance application may only determine to monitor the movements of user 606 in response to determining user 606 was viewing (e.g., was focusing on) media asset 602 prior to leaving viewing area 600. For example, a detection module (e.g., detection module 316 (FIG. 3)) associated with or incorporated into the media guidance application may detect that user 602 is focusing on (e.g., via eye detection component 500 (FIG. 5)), or otherwise paying attention to, media asset 602 presented on user device 604. In response, the media guidance application may monitor the movements of user 606 to determine whether or not one or more playback operations should be performed based on the movements.

In some embodiments, the media guidance application may determine what playback operation, if any, to perform based on comparing the determined length of time to a threshold length of time. For example, each playback operation may correspond to a particular length of time that the media guidance application determines user 606 was outside viewing area 600. For example, one threshold length of time may correspond to a first playback operation and a second threshold of time may correspond to a second playback operation. The media guidance application may compare the determined length of time to one or more of these thresholds. If the determined length of time corresponds to the first threshold length of time, then the media guidance application performs the first playback operation, and/or if the determined length of time corresponds to the second threshold length of time, then the media guidance application performs the second playback operation.

Figure 7:
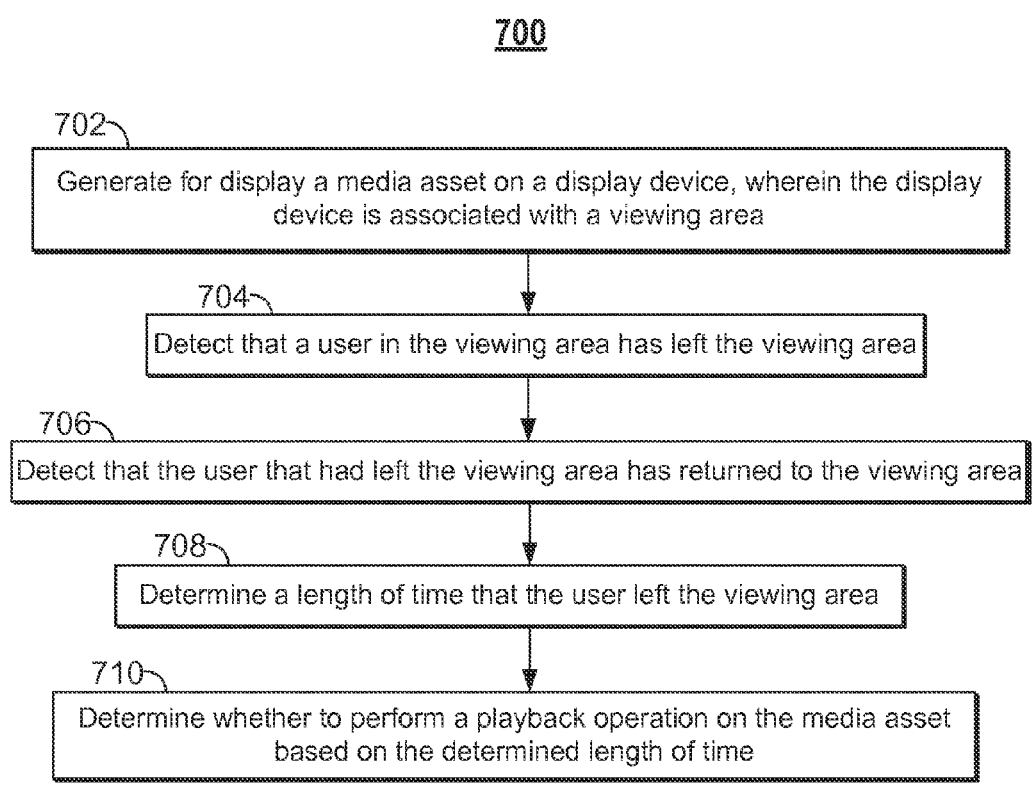
FIG. 7 is a flow chart of illustrative steps for determining whether to perform a playback operation based on the movements of a user in accordance with some embodiments of the disclosure.

FIG. 7 is a flow chart of illustrative steps for determining whether to perform a playback operation based on the movements of a user. It should be noted that process 700 or any step thereof could be performed on, or provided by, any of the devices shown in FIGS. 3-4. For example, process 700 may be executed by control circuitry 304 (FIG. 3) as instructed by a media guidance application implemented on a user device (e.g., user equipment devices 402, 404, and/or 406 (FIG. 4)) in order to determine a playback operation to perform. In addition, one or more steps of process 700 may be incorporated into or combined with one or more steps of any other process or embodiment (e.g., process 800 (FIG. 8)).

At step 702, the media guidance application generates for display (e.g., via control circuitry 304 (FIG. 3)) a media asset (e.g., media asset 602 (FIG. 6)) on a display device (e.g., user equipment device 402, 404, and/or 406 (FIG. 4)), in which the display device is associated with a viewing area (e.g., viewing area 600 (FIG. 6)). For example, the media guidance application may generate for display a program on a television, smartphone, personal computer, etc., located within a particular room and/or connected to a particular network (e.g., a home network). In such a case, the particular room or the home network may constitute the viewing area.

At step 704, the media guidance application may detect (e.g., via detection module 316 (FIG. 3) coupled to control circuitry 304 (FIG. 3)) that a user (e.g., user 606 (FIG. 6)) in the viewing area (e.g., viewing area 600 (FIG. 6)) has left the viewing area. For example, a detection module (e.g., detection module 316 (FIG. 3)) may user one or more of the techniques discussed above to identify a particular user and determine whether or not the user has entered and/or exited a viewing area. The media guidance application may also monitor the viewing area (e.g., viewing area 600) and record (e.g., in storage 308 (FIG. 3) or at any location accessible via communications network 414 (FIG. 4)) times associated with the entering and exiting of the user to/from the viewing area.

At step 708, the media guidance application determines (e.g., via control circuitry 304 (FIG. 3)) a length of time that the user (e.g., user 606 (FIG. 6)) left the viewing area (e.g., viewing area 600 (FIG. 6)). For example, the media guidance application may initiate a timer in response to detecting that a user has left a room. The timer may continue to run until the media guidance application detects that the user has returned to the room.

In some embodiments, the media guidance application may link the running of the time to the continued progression of the media asset (e.g., media asset 602 (FIG. 6)) on the display device (e.g., user device 602 (FIG. 6)) in the viewing area. For example, if the progression of the media asset is interrupted (e.g., by a pause command, power outage, network connectivity issues, advertisement breaks, etc.), the media guidance application may stop the timer until the progression of the media asset is resumed.

The media guidance application may then use the timer reading to determine the length of time that the user was outside the viewing area.

At step 710, the media guidance application determines (e.g., via control circuitry 304 (FIG. 3)) whether to perform a playback operation (e.g., one of a plurality of available playback operations listed in storage 308 (FIG. 3) and/or any location accessible by communications network 414 (FIG. 4)) on the media asset based on the determined length of time.

For example, the media guidance application may select a playback operation to perform, if any, from a plurality of playback operations based on the determined length of time.

In some embodiments, the media guidance application may cross-reference (e.g., via control circuitry 304 (FIG. 3)) the determined length of time with a database (e.g., located locally at storage 308 (FIG. 3) and/or located remotely at any location accessible by communications network 414 (FIG. 4)) listing a particular length of time that corresponds to each of the plurality of playback operations to select the playback operation. For example, if the user (e.g., user 606 (FIG. 6)) is outside the viewing area (e.g., viewing area 600 (FIG. 6)) for only a short period of time (e.g., less than one minute), the media guidance application may not perform any playback operation (e.g., as indicated by the cross-reference) as a user may not have missed enough content to warrant disrupting playback. If the user is outside the viewing area for a medium period of time (e.g., one minute to ten minutes), the media guidance application may rewind, jump to a previous chapter, etc. (e.g., as indicated by the cross-reference) as a user may have missed enough content to warrant disrupting playback. If the user is outside the viewing area for a long period of time (e.g., over ten minutes), the media guidance application may record the media asset for viewing at a later time (e.g., as indicated by the cross-reference) as a user may have missed so much content that the user will likely have to watch the program at another time.

In some embodiments, the media guidance application may access (e.g., via control circuitry 304 (FIG. 3)) one or more calendar or date planner functions to determine the amount of time that a user has available to view a media asset. The media guidance application may use the amount of available time as indicated by the calendar function to determine the various threshold lengths of time and the playback operations that correspond to each threshold.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 7.

Figure 8:
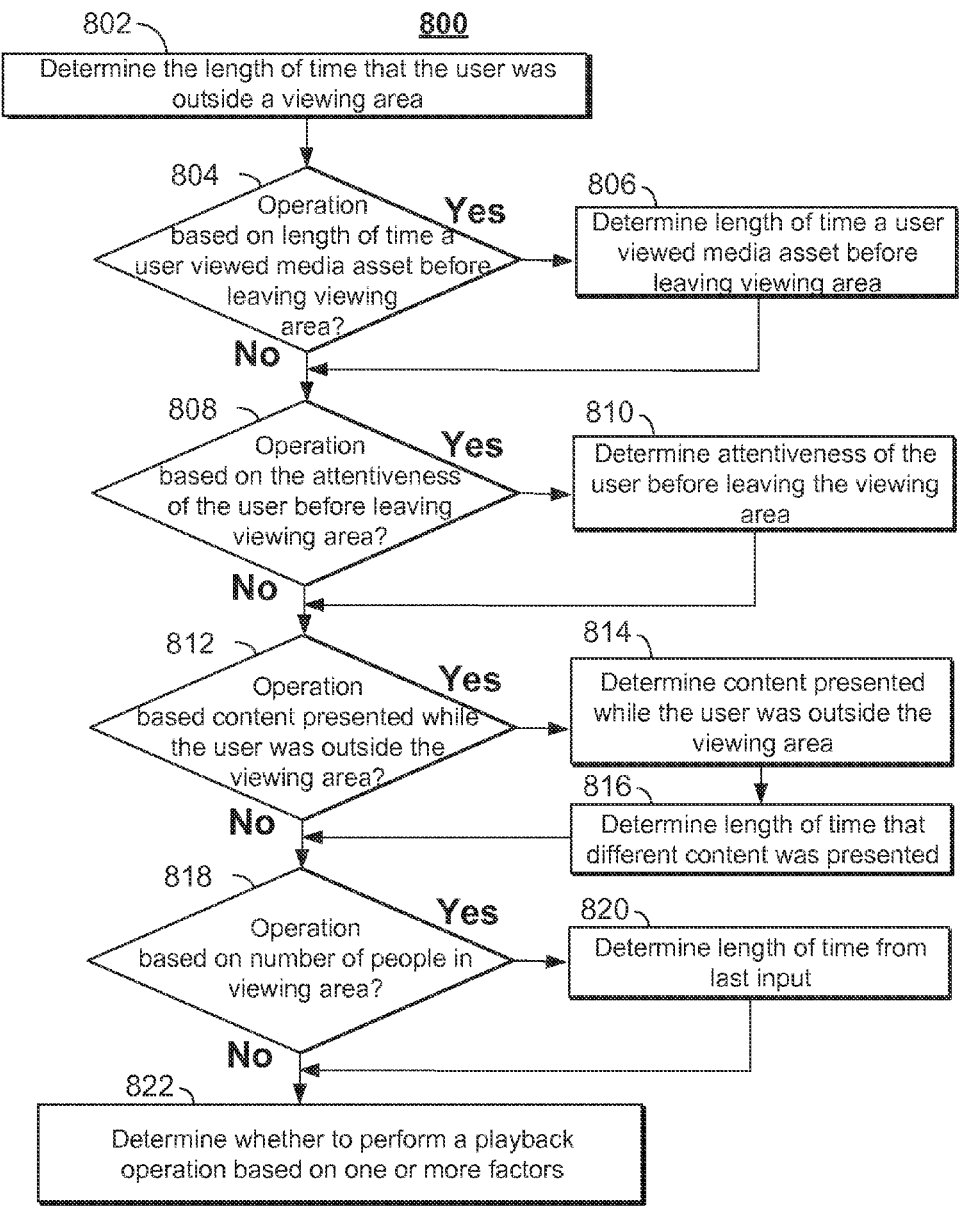
FIG. 8 is a flow chart of illustrative steps for determining whether to perform a playback operation based on factors other than, or in addition to, the movements of a user in accordance with some embodiments of the disclosure.

FIG. 8 is a flow chart of illustrative steps for determining whether to perform a playback operation based on factors other than, or in addition to, the movements of a user. It should be noted that process 800 or any step thereof could be performed on, or provided by, any of the devices shown in FIGS. 3-4. For example, process 800 may be executed by control circuitry 304 (FIG. 3) as instructed by a media guidance application implemented on a user device (e.g., user equipment devices 402, 404, and/or 406 (FIG. 4)) in order to determine a playback operation to perform. In addition, one or more steps of process 800 may be incorporated into or combined with one or more steps of any other process or embodiment (e.g., process 700 (FIG. 7)).

At step 802, the media guidance application determines (e.g., via control circuitry 304 (FIG. 3)) the length of time that a user (e.g., user 606 (FIG. 6)) was outside a viewing area (e.g., viewing area 600 (FIG. 6)) associated with a media asset (e.g., media asset 602 (FIG. 6)) or a user device (e.g., user device 604 (FIG. 6)). For example, in some embodiments, step 802 may incorporate one or more of the steps discussed above in relation to FIG. 6.

At step 804, the media guidance application determines (e.g., via control circuitry 304 (FIG. 3)) whether or not the playback operation selected will be based on the length of time a user (e.g., user 606 (FIG. 6)) viewed the media asset before leaving the viewing area. For example, the media guidance application may determine (e.g., via detection module 316 (FIG. 3)) an amount of time that the user was in the viewing area (e.g., viewing area 600 (FIG. 6)) prior to leaving the viewing area and perform the playback operation based in part on the determined amount of time. For example, the media guidance application may distinguish between a user that briefly entered a viewing area (or briefly viewed a media asset) from a user that was previously engaged with or actively viewing a media asset. For example, a casual passerby (e.g., a person briefly entering and exiting the viewing area) may not trigger the detection module (e.g., detection module 316 (FIG. 3)) associated with the media guidance application. Instead, the detection module (e.g., detection module 316 (FIG. 3)) associated with the media guidance application may only monitor the movements of a user if the user is identified as viewing the media asset (e.g., as indicated by the user being in the viewing area for a default amount of time, the user paying a particular amount of attention to the media asset, the user entering a user input acknowledging the desire to be monitored, etc.)

If the media guidance application determines (e.g., via control circuitry 304 (FIG. 3)) to select the playback operation based on the length of time a user (e.g., user 606 (FIG. 6)) viewed the media asset before leaving the viewing area, the media guidance application proceeds to step 806 and determines the length of time a user viewed the media asset (e.g., via information recorded by detection module 316 (FIG. 3)) before proceeding to step 808. If the media guidance application determines (e.g., via control circuitry 304 (FIG. 3)) not to select the playback operation based on the length of time a user (e.g., user 606 (FIG. 6)) viewed the media asset before leaving the viewing area, the media guidance application proceeds directly to step 808.

At step 808, the media guidance application determines (e.g., via control circuitry 304 (FIG. 3)) whether or not the playback operation selected will be based on the attentiveness of a user (e.g., user 606 (FIG. 6)) before leaving the viewing area. For example, the media guidance application may determine (e.g., via eye detection component 500 (FIG. 5) incorporated into detection module 316 (FIG. 3) a level of attentiveness or level of engagement of a user prior to leaving the viewing area (e.g., viewing area 600 (FIG. 6)) and perform the playback operation based in part on the determined amount of time.

For example, as discussed above, the media guidance application may use one or more techniques to determine whether or not a user in the viewing area is paying attention to the media asset. For example, based on the level of engagement of the user with the media asset (e.g., media asset 602 (FIG. 6)), the media guidance application may distinguish between users in the viewing area that playback operations should be based on and users in the viewing area that playback operations should not be based on.

If the media guidance application determines (e.g., via control circuitry 304 (FIG. 3)) to select the playback operation based on the attentiveness of the user, the media guidance application proceeds to step 810 and determines the attentiveness of the user (e.g., via information recorded by detection module 316 (FIG. 3)) before proceeding to step 812. If the media guidance application determines (e.g., via control circuitry 304 (FIG. 3)) not to select the playback operation based on the attentiveness of the user (e.g., user 606 (FIG. 6)), the media guidance application proceeds directly to step 812.

At step 812, the media guidance application determines (e.g., via control circuitry 304 (FIG. 3)) whether or not the playback operation selected will be based on the content presented while the user was outside the viewing area. For example, the media guidance application may determine (e.g., via detection module 316 (FIG. 3)) based on the content presented while the user was outside the viewing area and perform the playback operation based in part on the determined amount of time.

If the media guidance application determines (e.g., via control circuitry 304 (FIG. 3)) to select the playback operation based on the content presented while the user was outside the viewing area, the media guidance application proceeds to step 814 and determines the content presented while the user was outside the viewing area (e.g., via information recorded by detection module 316 (FIG. 3)) before proceeding to step 816 and determining the length of time that different content was presented.

For example, the media guidance application may determine (e.g., via control circuitry 304 (FIG. 3)) whether or not an advertisement was presented (e.g., instead of the media asset) while the user was outside the viewing area. If particular content (e.g., an advertisement) was presented, the media guidance application determines (e.g., via control circuitry 304 (FIG. 3)) a length of time associated with a portion of the determined length of time during which the particular content (e.g., the advertisement) was not presented on the display device during the determined length of time when the user was outside of the viewing area.

The media guidance application may then compare (e.g., via control circuitry 304 (FIG. 3)) the length of time associated with the portion to a threshold length of time (e.g., retrieved from storage 308 (FIG. 3)). Instead of selecting a playback operation based on the total length of the determined length of time, the media guidance application may select a playback operation based on the portion of the determined length of time that included the particular content (e.g., an advertisement). Alternatively, the media guidance application may subtract the amount of time (e.g., as indicated by the timer discussed in relation to step 708 (FIG. 7)) constituting the portion from the total determined length of time to arrive at an amount of time of the determined length of time that did not include the particular content.

Alternatively, the media guidance application may determine (e.g., via detection module 316 (FIG. 3)) a portion of time that particular content was presented to the user. For example, the media guidance application may retrieve (e.g., via control circuitry 304 (FIG. 3)) user preferences (e.g., from storage 308 (FIG. 3 and/or any location accessible via communications network 414 (FIG. 4)) and determine whether or not a portion of the media asset was of interest to the user. If so, the media guidance application determines the length of time of that portion for comparing to a threshold length of time.

If the media guidance application determines (e.g., via control circuitry 304 (FIG. 3)) not to select the playback operation based on the content presented while the user was outside the viewing area, the media guidance application proceeds directly to step 818.

At step 818, the media guidance application determines (e.g., via control circuitry 304 (FIG. 3)) whether or not the playback operation selected will be based on the number of people in the viewing area (e.g., viewing area 600 (FIG. 6)). For example, the media guidance application may determine (e.g., via detection module 316 (FIG. 3)) the movements and/or actions (e.g., attentiveness and/or engagement level of a user) of multiple users in the viewing area (e.g., viewing area 600 (FIG. 6)) and perform the playback operation based in part on the movement and actions based on one or more of the users.

For example, if several people are in the viewing area (e.g., viewing area 600 (FIG. 6)), the media guidance application may not perform a playback operation based on the movements of only one of the users as such a playback operation may be distracting to the remaining users. Instead, the media guidance application may account for multiple users (e.g., only performing a playback operation if a majority of the users leave the viewing area). Alternatively or additionally, the media guidance application may combine different factors. For example, the media guidance application may account for only people in the viewing area that are paying attention (e.g., as determined by eye detection component 500 (FIG. 5) incorporated into detection module 316 (FIG. 3)).

If the media guidance application determines (e.g., via control circuitry 304 (FIG. 3)) to select the playback operation based on the number of people in the viewing area, the media guidance application proceeds to step 820 and detects the number of people in the viewing area (e.g., via detection module 316 (FIG. 3)) before proceeding to step 822. If the media guidance application determines (e.g., via control circuitry 304 (FIG. 3)) not to select the playback operation based on the number of people in the viewing area, the media guidance application proceeds directly to step 822.

At step 822, the media guidance application determines (e.g., via control circuitry 304 (FIG. 3)) whether to perform a playback operation based on one or more factors. For example, the media guidance application accounts for the determinations made in steps 806, 810, 816, and 820, and selects a playback operation suiting these determinations.

For example, the media guidance application determines (e.g., via control circuitry 304 (FIG. 3)) whether to perform a playback operation (e.g., one of a plurality of available playback operations listed in storage 308 (FIG. 3) and/or any location accessible by communications network 414 (FIG. 4)) on the media asset (e.g., media asset 602 (FIG. 6)) based on the determinations.

In some embodiments, the media guidance application may cross-reference (e.g., via control circuitry 304 (FIG. 3)) the determinations, individually or in combination with a database (e.g., located locally at storage 308 (FIG. 3) and/or located remotely at any location accessible by communications network 414 (FIG. 4)), listing a particular determination that corresponds to each of the plurality of playback operations to select the playback operation (e.g., as discussed above in relation to step 710 (FIG. 7)).

It is contemplated that the steps or descriptions of FIG. 8 may be used with any other embodiment of this disclosure. In addition, the steps and descriptions described in relation to FIG. 8 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 8.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flow charts or examples relating to one embodiment may be combined with any other embodiment in a suitable manner, done in different orders, or done in parallel. In addition, the systems and methods described herein may be performed in realtime. It should also be noted, the systems and/or methods described above may be applied to, or used in accordance with, other systems and/or methods.

What is claimed is:

1. A method for automatically performing playback operations on media assets, the method comprising:
generating for display a media asset on a display device, wherein the display device is associated with a viewing area comprising a first plurality of users at a first point in time;
computing a first amount representing how many users of the first plurality of users at the first point in time, greater than one, are within the viewing area when the media asset is generated for display;
detecting that a first group of users of the first plurality of users at the first point in time in the viewing area has left the viewing area;
detecting that a second group of users of the first plurality of users at the first point in time in the viewing area has not left the viewing area;
in response to detecting that the first group of users has left the viewing area, computing a second amount representing how many users, greater than one, are within the viewing area comprising a second plurality of users at a second point in time, later than the first point in time, when the media asset is generated for display;
determining whether the second amount comprises a majority of the first amount; and
in response to determining that the second amount does not comprise a majority of the first amount, selecting one of a plurality of playback operations to perform on the media asset.

2. The method of claim 1, further comprising detecting that the first group of users in the viewing area has left the viewing area and detecting that the second group of users in the viewing area has not left the viewing area in response to determining the first group of users and the second group of users were viewing the media asset prior to the first group of users leaving the viewing area.

3. The method of claim 1, further comprising:
comparing the number of users in the first group and the number of users in the second group; and
selecting the one of the plurality of playback operations in response to determining that the number of users in the first group is greater than the number of users in the second group.

4. The method of claim 1, wherein the one of the plurality of playback operations is selected based on content of the media asset presented on the display device when the first group of users was outside of the viewing area.

5. The method of claim 1, further comprising:
determining an advertisement was presented on the display device during a determined length of time when the first group of users was outside of the viewing area;
determining a length of time associated with a portion of the determined length of time during which the advertisement was not presented on the display device during the determined length of time when the first group of users was outside of the viewing area;
comparing the length of time associated with the portion to a threshold length of time; and
in response to determining that the length of time associated with the portion corresponds to the threshold length of time, selecting the one of the plurality of playback operations to perform on the media asset.

6. The method of claim 1, further comprising:
determining an amount of time that the first group of users was in the viewing area prior to leaving the viewing area; and
selecting the one of the plurality of playback operations to perform based in part on the determined amount of time.

7. The method of claim 1, wherein the plurality of playback operations include rewinding the media asset to a progress point corresponding to when the first group of users left the viewing area.

8. The method of claim 1, further comprising:
receiving data from a global positioning system corresponding to a position of a first user device and a position of a second user device; and
determining from the position of the first user device and the position of the second user device whether the first user device is within a viewing area of the second user device.

9. A system for automatically performing playback operations on media assets, the system comprising:
storage circuitry configured to store instructions for a playback operation that may be performed on a media asset; and
control circuitry configured to:
generate for display a media asset on a display device, wherein the display device is associated with a viewing area comprising a first plurality of users at a first point in time;
compute a first amount representing how many users of the first plurality of users at the first point in time, greater than one, are within the viewing area when the media asset is generated for display;
detect that a first group of users of the first plurality of users at the first point in time in the viewing area has left the viewing area;
detect that a second group of users of the first plurality of users at the first point in time in the viewing area has not left the viewing area;
in response to detecting that the first group of users has left the viewing area, compute a second amount representing how many users, greater than one, are within the viewing area comprising a second plurality of users at a second point in time, later than the first point in time, when the media asset is generated for display;
determine whether the second amount comprises a majority of the first amount; and
in response to determining that the second amount does not comprise a majority of the first amount, select one of a plurality of playback operations to perform on the media asset.

10. The system of claim 9, wherein the control circuitry is further configured to detect that the first group of users in the viewing area has left the viewing area and the second group of users in the viewing area has not left the viewing area in response to determining the first group of users and the second group of users were viewing the media asset prior to leaving the viewing area.

11. The system of claim 9, wherein the control circuitry is further configured to:
compare the number of users in the first group and the number of users in the second group; and
select the one of the plurality of playback operations in response to determining that the number of users in the first group is greater than the number of users in the second group.

12. The system of claim 9, wherein the one of the plurality of playback operations is selected based on content of the media asset presented on the display device when the first group of users was outside of the viewing area.

13. The system of claim 9, wherein the control circuitry is further configured to:
- determine an advertisement was presented on the display device during a determined length of time when the first group of users was outside of the viewing area;
- determine a length of time associated with a portion of the determined length of time during which the advertisement was not presented on the display device during the determined length of time when the first group of users was outside of the viewing area;
- compare the length of time associated with the portion to a threshold length of time; and
- in response to determining that the length of time associated with the portion corresponds to the threshold length of time, select the one of the plurality of playback operations to perform on the media asset.

14. The system of claim 9, wherein the control circuitry is further configured to:
- determine an amount of time that the first group of users was in the viewing area prior to leaving the viewing area; and
- select the one of the plurality of playback operations to perform based in part on the determined amount of time.

15. The system of claim 9, wherein the plurality of playback operations include rewinding the media asset to a progress point corresponding to when the first group of users left the viewing area.

16. The system of claim 9, wherein the control circuitry further comprises:
- receive data from a global positioning system corresponding to a position of a first user device and a position of a second user device; and
- determine from the position of the first user device and the position of the second user device whether the first user device is within a viewing area of the second user device.

* * * * *